(12) United States Patent
Zaum et al.

(10) Patent No.: US 11,919,263 B2
(45) Date of Patent: Mar. 5, 2024

(54) METHOD FOR THE WEIGHT-DEPENDENT CONTROL OF THE INTERNAL PRESSURE OF A SUPPORTING BODY LOADED BY A WEIGHT LOAD OR A PAYLOAD

(71) Applicant: Continental Reifen Deutschland GmbH, Hannover (DE)

(72) Inventors: Christopher Zaum, Seelze-Letter (DE); Rainer Detering, Neustadt am Rbge (DE)

(73) Assignee: Continental Reifen Deutschland GmbH, Hannover (DE)

( * ) Notice: Subject to any disclaimer, the term of this patent is extended or adjusted under 35 U.S.C. 154(b) by 1089 days.

(21) Appl. No.: 16/630,482

(22) PCT Filed: Apr. 26, 2018

(86) PCT No.: PCT/EP2018/060697
§ 371 (c)(1),
(2) Date: Jan. 13, 2020

(87) PCT Pub. No.: WO2019/011496
PCT Pub. Date: Jan. 17, 2019

(65) Prior Publication Data
US 2021/0086459 A1 Mar. 25, 2021

(30) Foreign Application Priority Data
Jul. 13, 2017 (DE) ............... 10 2017 212 040.1

(51) Int. Cl.
*B29C 73/16* (2006.01)
*B60C 23/10* (2006.01)
(Continued)

(52) U.S. Cl.
CPC ............ *B29C 73/166* (2013.01); *B60C 23/10* (2013.01); *B60S 5/046* (2013.01); *F04B 35/04* (2013.01);
(Continued)

(58) Field of Classification Search
CPC ....... B29C 73/166; B60C 23/10; B60S 5/046; F04B 35/04; F04B 35/06; F04B 37/10;
(Continued)

(56) References Cited

U.S. PATENT DOCUMENTS 6,907,630 B2 * 6/2005 Treon .................. A61G 13/02
601/24

FOREIGN PATENT DOCUMENTS

DE 102015214006 A1 1/2017
RO 126135 A2 * 3/2011 ........... E21B 43/127

OTHER PUBLICATIONS

Machine Translated RO126135A2 (Year: 2011).*
(Continued)

*Primary Examiner* — Anne Marie Antonucci
*Assistant Examiner* — Misa H Nguyen
(74) *Attorney, Agent, or Firm* — Gregory Adams; Richard Wolf

(57) ABSTRACT

A method for the weight-dependent control of the internal pressure of a supporting body loaded by a weight load or payload, wherein the internal pressure is produced by means of an electric-motor-driven compressor, and the weight load or payload which is present and which acts on a supporting body in the form of a mass $m_{Load}$ under the effect of acceleration due to gravity g is determined in that a reduction and a subsequent increase in the internal pressure take place, wherein the increase in the internal pressure causes the position of an application point of the weight load or payload to change by a position difference $\Delta Z$, wherein:
(Continued)

Figure 1:
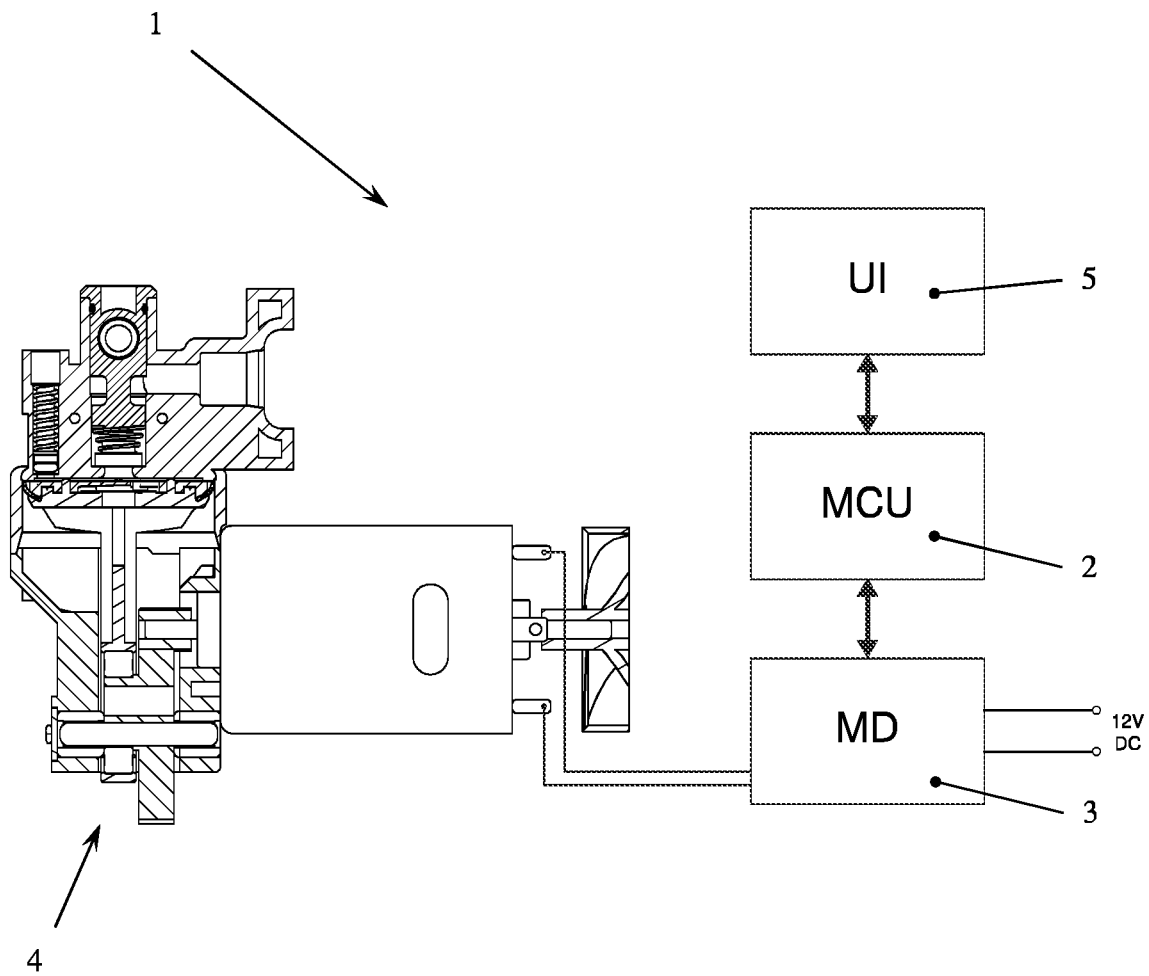

during the increasing of the internal pressure by means of the compressor, the motor current $I_{Load}$ of the drive motor of the compressor is measured with a constant motor voltage U and integrated over the time of the increase in pressure, and the electrical work $W_{Load}$ which is necessary for the change in position is determined therefrom, wherein the electrical work $W_{Load}$ the electrical work $W_{Load}$ is compared with a characteristic value of the electrical work $W_0$ from a characteristic diagram, wherein the change in position $\Delta Z$, the difference in mass $\Delta m$ and the difference in payload $\Delta F_Z$ are determined from the difference $\Delta W$ between $W_{Load}$ and $W_0$ and the mass $m_{Load}$ and the weight load or payload which is actually present as a result is determined therefrom.

5 Claims, 2 Drawing Sheets

(51) Int. Cl.
| | |
|---|---|
| *B60S 5/04* | (2006.01) |
| *F04B 35/04* | (2006.01) |
| *F04B 35/06* | (2006.01) |
| *F04B 37/10* | (2006.01) |
| *F04B 49/06* | (2006.01) |
| *G01G 19/10* | (2006.01) |
| *G01L 17/00* | (2006.01) |

(52) U.S. Cl.
CPC .............. *F04B 35/06* (2013.01); *F04B 37/10* (2013.01); *F04B 49/065* (2013.01); *G01G 19/10* (2013.01); *G01L 17/00* (2013.01)

(58) Field of Classification Search
CPC ............ F04B 49/065; F04B 2203/0201; F04B 2203/0202; F04B 2207/00; G01G 19/10; G01L 17/00
See application file for complete search history.

(56) References Cited

OTHER PUBLICATIONS

International Search Report dated Jul. 27, 2018 of international application PCT/EP2018/060697 on which this application is based.

* cited by examiner

METHOD FOR THE WEIGHT-DEPENDENT CONTROL OF THE INTERNAL PRESSURE OF A SUPPORTING BODY LOADED BY A WEIGHT LOAD OR A PAYLOAD

The invention relates to a method for the weight-dependent control of the internal pressure of a supporting body loaded by a weight load or payload, wherein the internal pressure is produced by means of an electric-motor-driven compressor. The invention also relates to a device for carrying out the method according to the invention when controlling the internal pressure of motor vehicle tires, and to use of the method.

A commonly found supporting body which is loaded by a weight load or payload is, for example, a pneumatic tire for motor vehicles. For safe operation of such motor vehicle tires it is absolutely necessary that the pressure in the tire has to be kept within relatively narrowly predefined limits so that the wear of the tire and the temperature loading are reduced and the tire satisfies its requirements e.g. with respect to load bearing capacity, rolling resistance and lateral guidance.

The setting of a correct air pressure is important, in particular, when the tire is to be inflated again after a tire failure and after a repair of the tires which has taken place outside a workshop, that is to say, for example, in the case of tire failures in which the tire often has to be only temporarily restored to a usable state.

Nowadays it is in fact no longer customary in many passenger cars to carry along a spare tire which is inflated to the setpoint pressure and mounted on a rim and which can then be mounted instead of the wheel with the defective tire. More and more vehicles carry a breakdown kit which takes up significantly less storage space than a spare tire and also weighs less. Such a tire repair kit usually includes a compressor, a sealing means which coagulates in the tire, usually a latex milk mixture, the corresponding connection hoses and the necessary cable connections for supplying energy as well as switches, manometers and further operator control elements. It therefore provides a complete repair kit which can be used continuously and with which it is possible to dispense with carrying a spare tire mounted on a rim or with the continual checking of other repair materials such as hoses, various tool keys, car jacks etc.

In addition to the primary repair function, the air compressor of such a tire repair kit can also be used for checking the air pressure and for changing the tire pressure. This additional function is in many cases even used more frequently than the actual tire repair function.

The setting of the tire pressure is carried out here exclusively manually using the manometer which is usually located on the compressor. The user has to obtain the corresponding rated pressures for the fitting and the loading from the vehicle manual, and automatically inflate the tires in such a way that the setpoint pressure is reached. In such a context, additional load of the vehicle, i.e. the weight load or payload which loads the tires as supporting bodies, is usually known to the user only approximately or not at all. Therefore, when setting the tire pressure, the user often sets a non-optimum tire pressure, especially when there is a high additional load.

A comparable problem can, of course, also arise with other supporting bodies, wherein not only repair processes have to be considered. Such situations can also occur, for example, in vehicles with suspension systems in which after high loading the vertical position or the position on the road which is necessary for safe driving is to be set again by a ride level control system which can be activated individually by the driver.

DE 10 2015 214 006 A1 discloses a method for measuring the pressure which is generated by an electric-motor-driven compressor in which the change in the average motor current of the electric motor driving the compressor, said change being dependent on the change in the pressure at the compressor output, is determined and is made available, or is displayed, as a pressure-proportional variable for the operation of the compressor of a control device in the form of an input variable. Although such a method permits a pressure to be determined without additional sensors or without an additional manometer, it is, however, disadvantageously not able to detect the required pressure as a function of the additional loading/load.

The object of the invention was therefore to provide a method for performing closed-loop control of the internal pressure of a supporting body which is loaded by a weight load or payload and which does not have the described disadvantages and provides a means of closed-loop control for occasional users as well as for automatic methods which can react in a reliable way to the loading which is actually present on a supporting body and permits a corresponding internal pressure setting.

This object is achieved by means of the features of the main claim. Further advantageous developments are disclosed in the dependent claims.

In this context, the existing weight load or payload, which acts in the form of a mass $m_{Load}$ under acceleration due to gravity g on a supporting body, is determined in that a decrease and a subsequent increase in the internal pressure take place.

As a result of the increase in the internal pressure, the position of an application point of the weight load or payload changes by a difference in position $\Delta Z$.

In this context, the following further method steps are carried out:

during the increasing of the internal pressure by the compressor, the motor current $I_{Load}$ of the drive motor of the compressor is measured with a constant motor voltage U and integrated over the time of the increase in pressure, wherein the electrical work $W_{Load}$ which is necessary for the change in position is determined as a product of the motor voltage and integrated motor current, the electrical work $W_{Load}$ is compared with a characteristic value of the electrical work $W_0$ from a characteristic diagram in which the values for the electrical work for achieving a normal position or standard position of the application point under normal load are stored in accordance with a normal load acting in the form of a normal mass $m_0$ under the effect of acceleration due to gravity g and further parameters of the supporting body, the change in position $\Delta Z$, the difference in mass $\Delta m$ and the difference in payload $\Delta F_Z$ are determined from the difference $\Delta W$ between $W_{Load}$ and $W_0$ by means of the relationships $$\Delta W = \Delta F_Z \cdot \Delta Z$$

and $$m_{LOAD} - m_0 = \Delta m$$

and $$\Delta F_Z = g \cdot \Delta m$$

and in turn the weight load or payload which is present after the pressure increase is determined therefrom, from the mass $$m_{LOAD} = \frac{U}{g \cdot \Delta Z}\left[\int I_{LOAD}(t)dt - W_0\right] + m_0$$

taking into account the acceleration due to gravity g, after which, the compressor is switched off in accordance with the weight load or payload which is determined in this way, when an internal pressure which is predefined for the determined weight load or payload on the basis of the parameters of the supporting body is reached.

By decreasing and increasing again the supporting body internal pressure in way which is controlled according to the invention and the determination of the associated loading work on the basis of the integration of the motor current it is possible to determine the weight load or payload automatically in conjunction with the other method steps. With a known payload, the optimum internal pressure can then be set automatically on the basis of predefined characteristic values/characteristic curves.

With respect to application of the method in, for example, supporting bodies in the form of motor vehicle tires, such a tire can then be inflated in an automated fashion in a way adapted to the actually present wheel load, without continuous checking by the user using a manometer or using tables.

The way of functioning according to the method can also be very easily explained using the example of the use of the method according to the invention in a motor vehicle tire. In order to increase the tire pressure it is actually necessary for an electrically driven air compressor which is provided for this purpose to perform certain electrical work. This work is mainly dependent on the delivered quantity of air, the counterpressure in the tire and the compression efficiency of the air compressor.

However, there is a measurable dependence on the loading on the tire, i.e. on the wheel load, since when there is an increase in pressure the center of gravity of the wheel is raised vertically. By using a previously determined reference characteristic curve of the unloaded (or normally loaded) tire it is possible to determine the additional work which is performed on the basis of the movement in the center of gravity, and therefore to calculate the wheel load.

Such a load measurement which is necessary to control the pressure can, of course, be applied to any type of pressure-controlled actuators. Precisely as in the case of the process of checking tire pressure and adapting tire pressure, the method constitutes a considerable simplification for the end user and improves the accuracy of the set internal pressure/tire pressure considerably.

One advantageous development consists in the fact that the electric-motor-driven compressor is controlled by means of an electronic motor control unit (MCU), the motor voltage and motor current are acquired and processed in such a way that the product of the motor voltage and integrated motor current is determined and compared with values of a characteristic diagram stored in an electronic memory of the motor control unit, wherein an electronic motor driver apparatus (MD=motor driver) for the drive motor of the compressor is actuated in accordance with the weight load or payload which is also determined by the motor control unit, and after comparison with values of a characteristic diagram, stored in a further electronic memory of the motor control unit, for the internal pressure which is predefined for the respective weight load or payload. In this way, the method according to the invention can be integrated very easily within control components and can be assisted with a compact combination of hardware and software.

A further advantageous embodiment consists in the fact that the electric-motor-driven compressor is provided with a pressure sensor which detects the internal pressure of the supporting body and transmits a signal, proportional to the internal pressure, to the electronic motor control unit (MCU) and/or to the electronic motor driver apparatus (MD). Such a pressure sensor then brings about inherent checking or feedback and closed-loop control in the entire method.

A corresponding pressure-sensitive evaluation of motor characteristic variables can, of course, also be carried out by virtue of the fact that the pressure is determined in a way as is disclosed in DE 10 2015 214 006 A1, specifically in that the change in the average motor current of the electric motor driving the compressor, said change being dependent on the change in the pressure at the compressor output, is determined and provided to a control device as a pressure-proportional variable for the operation of the compressor, in the form of an input variable. Since the motor current or the integration of the motor current is always necessary for the method according to the invention, such use constitutes a particularly simple possible implementation. In this respect, reference is made to the entire contents of DE 10 2015 214 006 A1.

A further advantageous embodiment consists in the fact that at least the determined weight load or payload and the determined internal pressure in the supporting body are transmitted as signals to further control or monitoring apparatuses of surrounding systems. In the case of an application of the method for motor vehicle tires it is helpful in this respect to pass on the determined variables to the central motor controller, which then produces possible messages to the driver via e.g. displays or signal devices, for example within the scope of the functions of a tire pressure checking system.

The method can be particularly advantageously implemented in a device which is embodied as a tire repair kit for inflating motor vehicle tires. In this context, the device has an electric-motor-driven compressor, preferably a reciprocating piston compressor which is driven by electric motor via a slider crank mechanism and has the purpose of inflating the motor vehicle tire, wherein the decreasing of the internal pressure as a result of the tire failure state is, of course, already predefined, and the internal pressure is increased by the inflation of the motor vehicle tire, during which the position of the wheel axle as an application point of the wheel load changes by a magnitude $\Delta Z$. The compressor which is driven by electric motor is then controlled by means of an electronic motor control unit (MCU) and an electronic motor driver apparatus (MD), motor driver for short and during the inflation process it is switched off in accordance with the determined weight load or payload, when an internal pressure predefined for the determined weight load or payload, of the motor vehicle tire is reached.

In such a device, the handling when checking the tire pressure and particularly when adapting the tire pressure to the actual load is simplified for the user to a high degree. Furthermore, the accuracy of the tire pressure which is set is improved. Overall, increasing the user friendliness of the devices in such a way brings about greater acceptance.

This is also the case to a pronounced degree if the device is embodied as a tire repair kit for sealing and inflating motor vehicle tires, in which a valve and distributor unit having a connection for a container with sealing means is provided for sealing means and pressurized gas, and in which also connecting means such as, for example, hoses are present between the valve and distributor unit and the inflatable object, as well as, if appropriate, connecting means for energy supply devices, switching devices and/or control and display devices for the operation of the device. Therefore, the tire is sealed and inflated as it were in one working process. Particularly in such "emergency cases" in which e.g. there is great urgency to perform work quickly on the road and next to the flowing traffic, laborious setting of the air pressure and adaptation to load situations are often forgotten.

Of course, the method according to the invention can also be used advantageously in many other cases and fields of use, for example for controlling the internal pressure in a supporting body which is embodied as an air spring bellows of a vehicle pneumatic suspension system. As has already been stated above, such control processes can be performed either manually or automatically. In both cases, the method according to the invention is advantageous since it is possible to dispense with a further sensor system and measuring devices.

Figure 2:
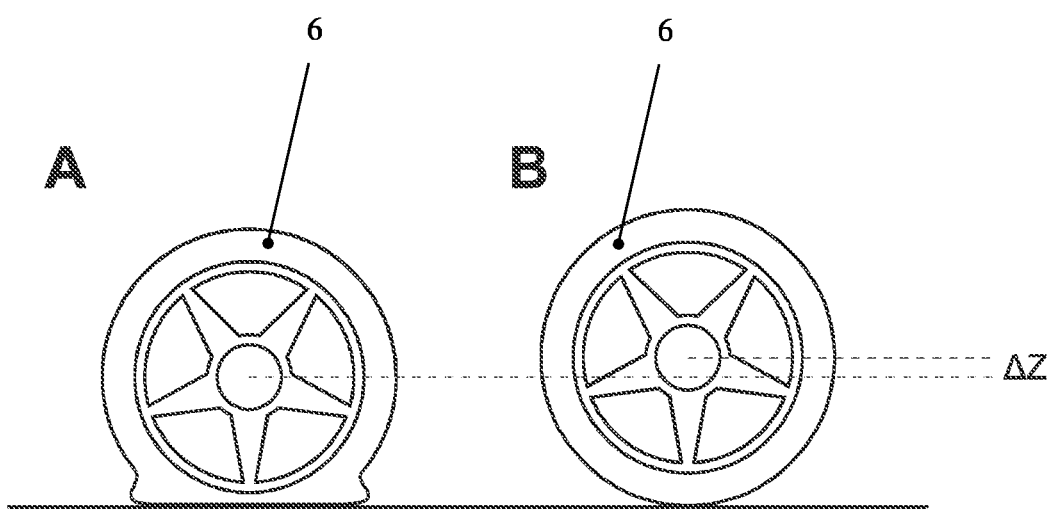

The method according to the invention is to be explained in more detail below on the basis of an exemplary embodiment, specifically on the basis of a tire repair kit for motor vehicle tires. In the drawings:

FIG. 1 shows a basic view of the design of an air compressor unit for a device which is embodied as a tire repair kit and has the purpose of carrying out the method according to the invention, and FIG. 2 shows a schematic view of the inflation process of a vehicle tire.

FIG. 1 shows a basic view of the design of an air compressor unit 1 for a device which is embodied as a tire repair kit and has the purpose of carrying out the method according to the invention, that is to say an "electronically" assisted tire repair kit. A control unit 2 (MCU) controls the connected air compressor 4 by means of a motor driver 3 (MD) via the user interface 5 (UI) depending on the user's requirements.

Therefore, the term air compressor unit denotes here the assembly of the tire repair kit which comprises the control unit, the motor driver, the air compressor as such with piston compressor, motor and transmission and the user interface.

During operation, the control unit (MCU) acquires all the relevant system parameters such as the temperature, motor voltage, motor current or counterpressure. In this context, the pressure measurement can be carried out by means of an electronic pressure sensor or else by means of the evaluation of the data of the average motor current, as stated above.

FIG. 2 is a schematic illustration of the process of inflating a vehicle tire 6 with air. From the state A (deficiency of air or excessively low internal pressure) to the state B (prescribed air pressure) the air pressure in the tire 6 is increased from the pressure $P_{START}$ to the pressure $P_{END}$ by the air compressor 4. Here, the center of gravity of the tire is raised by the magnitude difference $\Delta Z$. Here, the air compressor 4 carries out the electrical work $W_{LOAD}$ at the motor voltage U and the instantaneous current $I_{LOAD}$.

$$W_{LOAD} = U \cdot \int_{t_0(P=P_{START})}^{t_1(P=P_{END})} I_{LOAD}(t)dt$$

Here, the work which is carried out is composed of the part $W_0$ of the increase in pressure of the tire which is normally loaded with the mass $m_0$ and the part $\Delta W$ of the movement of the center of gravity of the tire which is additionally loaded by the mass $m_{LOAD}=m_0+\Delta m.$ $W_{LOAD}=W_0+\Delta W$ The portion $W_0$ has been determined in advance in a calibration measurement for the corresponding system configuration (vehicle type, tire size, tire position, operating voltage, operating temperature, starting pressure and end pressure) and stored as a value table or as a characteristic diagram in the control unit (MCU). By measuring and integrating the instantaneous motor current $I_{LOAD}$ it is possible to measure the work $W_{LOAD}$ in the control unit (MCU) and therefore calculate the portion of the movement of the center of gravity.

$\Delta W=U[\int I_{LOAD}(t)dt-W_0]$

With the relationship $\Delta W=\Delta F_Z \cdot \Delta Z$ it is possible to calculate from this value the weight force $\Delta F_Z=g \cdot \Delta m$ acting in addition to the normally loaded case, and therefore also to calculate the wheel load $m_{LOAD}$.

$$m_{LOAD} = \frac{U}{g \cdot \Delta Z}\left[\int I_{LOAD}(t)dt - W_0\right] + m_0$$

In order to estimate the measuring accuracy, the average motor current $\bar{I}_{LOAD}$ and $\bar{I}_0$ are also finally considered here.

$$\Delta m = \frac{U}{g \cdot \Delta Z}[\bar{I}_{LOAD} \cdot \Delta t - \bar{I}_0 \cdot \Delta t] = \frac{U \cdot \Delta \bar{I} \cdot \Delta t}{g \cdot \Delta Z}$$

Where $\Delta \bar{I}=\bar{I}_{LOAD}-\bar{I}_0$ the following is obtained $$\Delta \bar{I} = \frac{g \cdot \Delta m \cdot \Delta Z}{U \cdot \Delta t} \leftrightarrow \frac{\Delta m}{\Delta \bar{I}} = \frac{U \cdot \Delta t}{g \cdot \Delta Z}$$

For the typical parameters U=12V, $\Delta t$=300 s and $\Delta Z$=5 cm, an accuracy factor of 7.3 kg/mA is obtained. Given a measuring accuracy of the motor current measurement of 5 mA it is therefore possible to determine a wheel load with an accuracy of approximately 40 kg. This is completely sufficient for setting the optimum tire pressure.

LIST OF REFERENCE NUMBERS (Part of the Description)
 1 Air compressor unit
 2 Control unit (MCU)
 3 Motor driver (MD)
 4 Air compressor
 5 User interface (UI)
 6 Vehicle tire

The invention claimed is:
1. A method for the weight-dependent control of the internal pressure of a supporting body loaded by a weight load or payload, wherein the internal pressure is produced by means of an electric-motor-driven compressor, characterized in that the weight load or payload which is present and which acts on a supporting body in the form of a mass $m_{Load}$ under the effect of acceleration due to gravity g is determined in that a reduction and a subsequent increase in the internal pressure take place, wherein the increase in the internal pressure causes the position of an application point of the weight load or payload to change by a position difference $\Delta Z$, wherein the following further method steps are carried out:

during the increasing of the internal pressure by means of the compressor, the motor current $I_{Load}$ of the drive motor of the compressor is measured with a constant motor voltage U and integrated over the time of the increase in pressure, wherein the electrical work $W_{Load}$ which is necessary for the change in position is determined as a product of the motor voltage and integrated motor current, the electrical $W_{Load}$ is compared with a characteristic value of the electrical work $W_0$ from a characteristic diagram in which the values for the electrical work for achieving a normal position or standard position of the application point under normal load are stored in accordance with a normal load acting in the form of a normal mass $m_0$ under the effect of acceleration due to gravity g, and further parameters of the supporting body, the change in position $\Delta Z$, the difference in mass $\Delta m$ and the difference in payload $\Delta F_Z$ are determined from the difference $\Delta W$ between $W_{Load}$ and $W_0$ by means of the relationships $$\Delta W = \Delta F_Z \cdot \Delta Z$$

and $$m_{LOAD} - m_0 = \Delta m$$

and $$\Delta F_Z = g \cdot \Delta m$$

and in turn the weight load or payload which is present after the pressure increase is determined therefrom, from the mass $$m_{LOAD} = \frac{U}{g \cdot \Delta Z} \left[ \int I_{LOAD}(t) dt - W_0 \right] + m_0$$

taking into account the acceleration due to gravity g, after which the compressor is switched off in accordance with the weight load or payload which is determined in this way, when an internal pressure which is predefined for the determined weight load or payload on the basis of the parameters of the supporting body is reached.

2. The method as claimed in claim 1, in which the electric-motor-driven compressor is controlled by means of an electronic motor control unit, the motor voltage and motor current are acquired and processed in such a way that the product of the motor voltage and integrated motor current is determined and compared with values of a characteristic diagram stored in an electronic memory of the motor control unit, wherein an electronic motor driver apparatus for the drive motor of the compressor is actuated in accordance with the weight load or payload which is also determined by the motor control unit, and after comparison with values of a characteristic diagram, stored in a further electronic memory of the motor control unit, for the internal pressure which is predefined for the respective weight load or payload.

3. The method as claimed in claim 1, in which the electric-motor-driven compressor is provided with a pressure sensor which detects the internal pressure of the supporting body, or with a corresponding pressure-sensitive evaluation of the motor characteristic variables, as result of which a signal which is proportional to the internal pressure is transmitted to the electronic motor control unit and/or to the electronic motor driver apparatus.

4. The method as claimed in claim 1, which at least the determined weight load or payload and the determined internal pressure in the supporting body are transmitted as signals to further control or monitoring apparatuses of surrounding systems.

5. The method as claims in claim 1, wherein the supporting body is an air spring bellows of a vehicle pneumatic suspension system.

* * * * *